March 13, 1928.
C. W. BROWN
TROLLEY WHEEL CARRIER
Filed Dec. 15, 1924
1,662,233
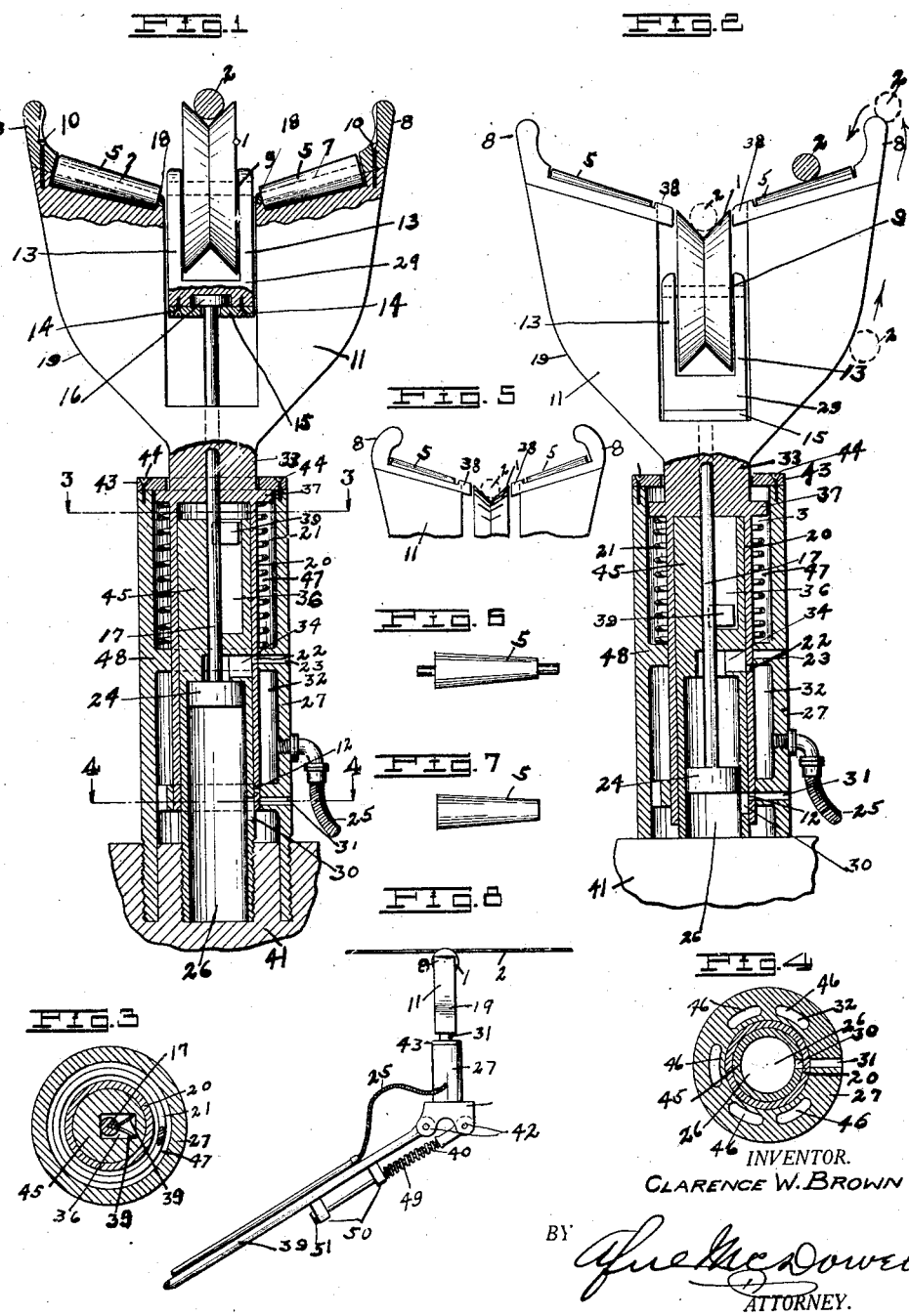

Patented Mar. 13, 1928.

1,662,233

UNITED STATES PATENT OFFICE.

CLARENCE W. BROWN, OF LOS ANGELES, CALIFORNIA.

TROLLEY-WHEEL CARRIER.

Application filed December 15, 1924. Serial No. 756,072.

1. My invention relates to improvements in mechanisms for holding trolley wheels in proper place, up against trolley wires, in connection with operation of electric trolley cars, in which invention reciprocating air valves and a coil spring operate with other mechanism to keep the trolley wheel in place against trolley wire.

2. The objects of my invention are:

(a) To prevent trolley wheel from leaving trolley wire.

(b) To prevent trolley pole from continually striking cross wires which support trolley wire.

(c) To replace, automatically, trolley wheel in normal position against trolley wire.

(d) To enable electric trolley cars to be backed, without necessity of changing position of trolley pole.

3. I attain these objects by the mechanism illustrated in the accompanying drawing, in which Figure 1 is a vertical cross section of the entire apparatus, with the trolley wheel pressing upward against trolley wire; Fig. 2 is a front view of the body, wings, and cross section of housing and other lower parts of the apparatus, wheel being held down below the rollers, instead of above the rollers as in Fig. 1; and showing trolley wire resting on a roller, instead of on the trolley wheel as in Fig. 1; Fig. 3 is a cross section of top of that part of the apparatus nearest top of coil spring, showing housing, spring piston rod, and sleeve; Fig. 4 is a cross section of the middle part of the body below the coil spring and across the principal air chamber. Fig. 5 is a front view of the upper part of the apparatus illustrating how the upper points of the wings may be curved inward more than is illustrated in Figs. 1 and 2. Fig. 6 is front view of a roller shaped something like a rolling pin and of roller shown in Figs. 1 and 2; Fig. 7 is a roller shaped like a roller bearing, minus the hole for shaft illustrated in Fig. 1. This Fig. 7 can be made to rotate in a groove as hereinafter explained. Fig. 8 is a side view of the entire apparatus fixed in normal position to top of trolley pole and pressing upward against trolley wire.

4. Similar numerals refer to similar parts thruout the several views.

5. Figure 1: Under normal conditions, compressed air, from the air compressor of the car, passes thru flexible air tube 25, into air reservoir 32, which reservoir is also illustrated in Fig. 4. The air in air chamber or reservoir 32, passes thru valve 30, into air chamber 26, and presses upward against piston 24, forcing this piston, and piston rod 17, upward against piston head 16, which by two bolts 14, is secured by circular collar 15, to the base 29 of the two arms 13 supporting axle shaft 9 around which trolley wheel 1 rotates against trolley wire 2. This position and contact between trolley wheel 1 and trolley wire 2 are aided by expansion of coil spring 21 upward against circular outer edge projection 37 of the middle section or neck of the body 31. In this position (Fig. 1) trolley wheel 1 properly engages with trolley wire 2. When trolley wire 2 leaves trolley wheel 1, the spring located on top of the car and at the base of trolley pole 39 (Fig. 5), forces this trolley pole and Figure 1 upward so that trolley wire is brought into contact with the entire apparatus; then usually the wire 2 strikes against the inner side of protectors 8, and slides downward toward the middle, along roller 5, and finally rests in the groove of trolley wheel 1, as illustrated in Fig. 2. Rollers 5 are shaped like roller bearings, and can be made to rotate around axles 7, as in Fig. 1; or can be made as in Fig. 7, without axles and so as to revolve in grooves sunk in the position illustrated, in the top of the body 11; or the roller may be shaped like a rolling pin Fig. 6, rotating around, and supported by, solid cylindrical projections extending outward from the ends of the roller 5, and resting in grooves cut for that purpose in the adjacent parts of the body 11. I prefer to use rollers 5 made to operate in such grooves and without axles as in Fig. 1 and without end projections, as in Fig. 6, because the axle type and the rolling pin type require the leaving of so much of the body 18 between the roller 5 and the arms 13, to provide for the end of the axle 7, or for the end of the rolling-pin type (Fig. 6), that there would be probability of the trolley 2 resting or dragging on the space 18 and 38 instead of the wire's passing from the roller 5 directly into the groove of the wheel. 10 are two bolts for fastening protectors 8, when these protectors are made movable.

6. Fig. 2: In Fig. 2, trolley wheel 1 is shown below, instead of above, roller 5; for when the trolley wire 2, after jumping trolley wheel 1, was caught by the inside of protector 8, and pressed downward upon roller 5, the entire body 11 and the sleeve 20, were, by the downward pressure of trolley wire 2, forced downward, compressing spring 21, so that valve 30 opened directly into valve 12 in sleeve and valve 31 in the housing 27, thereby discharging from air chamber 26, compressed air which had previously held piston 24 up to top of air chamber 26 as shown in Fig. 1. This downward movement of piston 24 is aided also by passage of compressed air from air chamber 32, thru sleeve valve 22, into the air space 34, which opens into the top of air chamber 26.

7. Fig. 2 shows trolley wheel down. As soon as trolley wire slides down and presses against trolley wheel 1, all pressure being then removed from roller 5 and body 11, spring 21 forces body 11, valve 12, and sleeve 20, upward, thereby closing valve 30, and opening sleeve valve 22 into valve 23 as in Fig. 1. This causes air, which comes from reservoir 32 thru valve 30 into cylinder 26, to become compressed under piston 24, forcing piston 24 upward, and releasing air from above piston 24 thru open valves 22 and 23, as in Fig. 1.

8. In Fig. 2, the projections 38 shown near top of trolley wheel, are the braces used to prevent the two arms 13 from yielding backward or forward while these arms 13 and piston rod 17 endure the strain resulting from backward, downward, gravity pressure of trolley wire 2, and upward spring pressure of trolley pole. When these arms 13 and the trolley wheel 1, are up as in Fig. 1, two of these projections 38 are in front, of and two behind, the arms 13.

9. These operations of the air valves and these movements of the entire mechanism, are instantaneous, for a very strong air pressure is always ready, and at hand, in the large air reservoir 32 which surrounds the inner parts of the lower part of the mechanism, the reservoir being marked 32, in Figs. 1, 2, and 4.

10. If, while trolley wheel 1 is up as in Fig. 1, trolley wire 2 jumps from trolley wheel 1, and fails to be caught between protectors 8, then trolley pole 39, on straightening upward, as the car moves, will cause the upper part of the apparatus to strike cross wire, when the entire apparatus will be forced back down below trolley wire, which, as in Fig. 2, will pass upward along the convex outside of the body 11, and over protector 8, as illustrated by unshaded outlines of trolley wire 2 shown in Fig. 2. This is almost certain to occur, for the trolley wire 2, is directly above the middle of the car, and the trolley pole tends to straighten itself upward and against the wire. When the apparatus strikes a cross wire, the entire apparatus yields backwards, under the influence of spring 40 (Fig. 8).

11. The body 11, being circular at its neck 33, can rotate, with piston rod 17 as axis; but to prevent too much rotation, two flat springs 39 are fastened into a side of piston rod 17, and fit into corners of the chamber 36, so that as shown in Fig. 3, piston rod 17, can rotate only a limited distance from side to side in the opening or chamber 36 in which these springs operate. This chamber extends upward and downward so that the piston rod 17 can move upward and downward as its becomes necessary for trolley wheel 1 to move upward and downward.

12. Allowing the body 11, with the trolley wheel 1, to rotate with piston rod 17 as axis, allows the trolley wheel 2, to follow, in a straight line, the direction of the trolley wire, while the car rocks from side to side, twists its forward and rear ends from side to side, and makes various other unusual movements caused by imperfections in the road bed.

13. The body 11 and its neck 33 may be built solid or hollow; and the housing 27 may be screwed into the base 41, which is supported by a double hinge 42 and coil spring 40, as shown in Fig. 8 with flexible air tube extending from the air compressor line of the car, upward along trolley pole 39, and entering the housing as shown in Figs. 1, 2, and 8.

14. In this Fig. 2 and Fig. 5, as well as in Fig. 1, the protectors 8 are just high enough to miss striking cross wires, when the trolley wire is down in the groove of trolley wheel 1, as shown in Fig. 2.

15. To secure the collar or circular plate, 43, the bolts 44 may be counter sunk and soldered, or this collar 43 can be made with smaller diameter, its circumference threaded and this collar then screwed down inside of housing 27, on threads made inside of the top of the housing, 27.

16. Figure 3 shows a cross section of that part of the top of the apparatus near the top of the coil spring, at the point marked 3, on Fig. 1. 27 is the housing; 47 is space where coil spring 21 operates; 21 is coil spring; 20 is sleeve; 45 is solid part of metal surrounding piston rod 17; 34 are two flat springs fastened into side of piston rod 17 and operating to prevent piston rod 17 from rotating too much in space 36.

17. Figure 4 shows cross section at the place marked 4, on Fig. 1. 27 is outer housing, which, at this point, extends across the main air reservoir in a manner similar to the inside projection at 48 in Fig. 1. Fig. 4, the openings 46 allow air to pass thru this cross section upward and downward into and out of the main parts of the reservoir 32. These openings 46 could just as well be eliminated, but I use them so as to allow more space for storing compressed air. This projection of the housing across the apparatus, as shown in this Fig. 4, could be eliminated, also, but I use this cross projection to keep the sleeve 20 and the lower walls 45 of the cylinder 26, in proper place and position. 31 is the opening in the housing thru which is exhausted, air from under piston 24 by way of valve 30. 26 is cylinder.

18. Figure 5 shows cross section of upper part of body, showing how protectors 8 may be hooked, instead of being knobbed as in Fig. 1.

19. Figure 6 shows roller 5 shaped like a rolling pin instead of the shape of roller 5 indicated in Fig. 1.

20. Figure 7 shows roller 5 made solid like a roller bearing instead of being shaped as roller 5 in Fig. 1.

21. Figure 8 show a side view of the completed apparatus, 1 being trolley wheel pressing upward against trolley wire 2. 19 is convex side of upper part of the body, 33 being circular neck, 43 being collar or plate which holds down sleeves 20 and coil spring 21. 27 is the outer housing. 25 is flexible air tube extending along trolley pole 39, 41 is solid base. 42 is a double hinge which holds the apparatus upright. Coil spring 40 allows the apparatus to yield forward or backward when necessary. 49 is a rod extending from double hinge 42 through coil spring 40 and brackets 50, to lock nut 51.

22. For lubrication oil cups or grease cups can be fitted thruout the apparatus at all wearing surfaces and space where coil spring 21 operates can be filled with oil or grease which would lubricate coil spring 21 indefinitely and sleeve 20 indefinitely.

I claim:

1. In a device of the character described, the combination, with a trolley wheel, for cooperation with a trolley wire of a piston, connection between the piston and wheel for supporting the latter from the piston, a cylinder within which the piston operates, a source of fluid under pressure, a valve controlling the supply of pressure fluid to the cylinder, and means operated by the trolley wire when it leaves the wheel for shifting the said valve to cause the wheel to be moved into position for again receiving the trolley wire.

2. In a device of the character described, the combination, with a trolley wheel for cooperating with a trolley wire, of a piston, connections between piston and wheel for supporting the latter from the piston, a cylinder within which the piston operates, a source of fluid under pressure, a valve for controlling the supply of fluid to said cylinder, movable means cooperating with the wheel and trolley wire, for guiding the wheel and wire toward each other, and connections between movable means and valve for shifting the latter, the structure being such that when the wheel leaves the wire, the guiding means is moved to shift the valve and admit pressure fluid to cylinder for moving the wheel into position for receiving the wire from the guiding means.

3. In a device of the character described, the combination with a trolley pole, of a housing carried by said pole, a cylinder and piston within said housing, a trolley wheel supported by said piston to contact with a trolley wire, guiding means on opposite sides of the wheel and movable with respect thereto, a spring for normally holding the guiding means in elevated position, a source of fluid under pressure, and a valve connected with the guiding means and movable therewith, the structure being such that when the wheel leaves the trolley wire, the latter depresses the guiding means to admit compressed fluid into the cylinder for moving the trolley wheel into position for again receiving the wire from the guiding means.

4. In a device for automatically replacing a trolley wheel on a trolley wire, a trolley wheel, supporting means whereby the wheel is normally retained in position for engagement with the wire, guiding means cooperating with the wheel and wire, said guiding means being engageable with, and movable by, the wire when the wheel leaves the latter, and mechanism associated with the supporting means and guiding means and adapted to be operated by the latter when the wheel leaves the trolley wire for causing the wheel to be shifted to again receive the wire from the guiding means.

5. In a device of the character described, the combination with a trolley wheel for co-operation with a trolley wire, of a piston, connections between piston and wheel for supporting the latter from the piston, a cylinder within which the piston operates, a source of fluid under pressure, a valve between said source and said cylinder, said valve having two ports, one on each side of the piston, guiding means cooperating with the wheel and trolley wire and movable by the latter, when the wheel leaves the wire, and connections between guiding means and the valve for shifting the latter as the means is moved by the trolley wire, the construction being such that while the wheel is on the wire the valve is held with one of its ports open to admit compressed fluid beneath the piston to hold the wheel against the wire, and when the wheel is off the wire, the guiding means is moved to shift the valve and open the other port to admit compressed fluid above the piston to depress the wheel into position for receiving the wire from the guiding means.

6. In a device of the character described, the combination of a trolley wheel, guides for a trolley wire associated with said wheel, means for supporting the wheel between said guides, said means being mounted for turning movement, a spring connected with the trolley supporting means, and members rigidly connected with the guides and positioned for cooperation with said spring for limiting the turning movement of the wheel support with respect to the guides.

7. In a device of the character described, the combination of a trolley with movable support, mounted above, and fastened to, a housing inclosing a cooperating coil spring and air chambers, means cooperating therewith, for replacing the trolley against an electrical conductor; a movable means for supporting and holding up all of the foregoing apparatus, a trolley pole carrying all of the foregoing (excepting the above-mentioned electrical conductor) and fastened to said apparatus; and a shaft secured to said supporting means by a pin, said shaft being surrounded, on one end, by a coil spring, the other end of said shaft being secured loosely by lugs fastened to the trolley pole; all cooperating to replace said trolley against the electrical conductor and to support and hold up, said supporting means, all substantially as shown.

8. In a device of the character described, the combination of trolley wheel, means co-operating with said wheel for replacing said wheel against the trolley wire, a movable support connected therewith, a rod connected with said support, and a coil spring thru which said rod passes from said support to a trolley pole by means of lugs fastened to said pole, and a compressed-air chamber within a housing, all, substantially as shown.

9. In a device of the character described, the combination, with a trolley wheel, for cooperation with an electrical conductor, of a piston, connections between the piston and wheel for supporting the latter from the piston, a cylinder within which the piston operates, a source of fluid under pressure, a valve controlling the supply of pressure fluid to the cylinder, and means operated by the said electrical conductor when it leaves the wheel for shifting the said valve to cause the wheel to be moved into position for again receiving said conductor.

10. In a device of the character described, the combination with a trolley pole, of a housing carried by said pole, a cylinder and piston within said housing, a trolley wheel supported by said piston to contact with an electrical conductor, guiding means on opposite sides of the wheel and movable with respect thereto, a spring for normally holding the guiding means in elevated position, a source of fluid under pressure, and a valve connected with the guiding means and movable therewith, the structure being such that when the wheel leaves the said electrical conductor, the latter depresses the guiding means to admit compressed fluid into the cylinder for moving the trolley wheel into position for again receiving said electrical conductor from the guiding means.

11. In a device for automatically replacing a trolley wheel on an electrical conductor, a trolley wheel, supporting means whereby the wheel is normally retained in position for engagement with said electrical conductor, guiding means cooperating with the wheel and said conductor, said guiding means being engageable with, and movable by, said conductor when the wheel leaves the latter, and mechanism associated with the supporting means and the guiding means and adapted to be operated by the latter when the wheel leaves said conductor for causing the wheel to be shifted to again receive said conductor from the guiding means.

12. In a device of the character described, the combination with a trolley wheel, for cooperation with an electrical conductor, of a piston, connections between the piston and wheel for supporting the same from the piston, a cylinder within which the piston operates, a reservoir, source of fluid under pressure, a valve controlling the supply of pressure fluid to said cylinder and reservoir, a means operated by said electrical conductor when it leaves the wheel for shifting said valve to cause said wheel to be moved into position for again receiving said conductor, a housing cooperating with said piston, wings (being side projections) extending outward on both sides of said wheel, and movable means cooperating with said wings and piston for guiding the wheel and said electrical conductor toward each other, and connections between all of said parts, constructed in such manner that when the wheel leaves said conductor, the guiding means is moved to shift said wheel and wings into position for replacing said wheel into normal contact with said conductor.

Signed at Los Angeles, in the county of Los Angeles, State of California, on January 26, 1926.

CLARENCE W. BROWN.